L. H. BACHE

Feb. 24, 1931. MECHANISM FOR USE IN COMBINATION DRILLING RIGS Re. 17,981

Original Filed June 25, 1923 3 Sheets-Sheet 1

Inventor

Louis H. Bache

By Lyon & Lyon

Attorneys

L. H. BACHE

Feb. 24, 1931. MECHANISM FOR USE IN COMBINATION DRILLING RIGS Re. 17,981

Original Filed June 25, 1923 3 Sheets-Sheet 2

Inventor
Louis H. Bache

By Lyon & Lyon
Attorneys

L. H. BACHE

Feb. 24, 1931. MECHANISM FOR USE IN COMBINATION DRILLING RIGS Re. 17,981

Original Filed June 25, 1923 3 Sheets-Sheet 3

Inventor
Louis H. Bache

By Lyon & Lyon Attorneys

Reissued Feb. 24, 1931 Re. 17,981

UNITED STATES PATENT OFFICE

LOUIS H. BACHE, OF ROCHESTER, NEW YORK, ASSIGNOR TO THE NATIONAL SUPPLY COMPANY OF DELAWARE, OF NEW YORK, N. Y., A CORPORATION OF DELAWARE

MECHANISM FOR USE IN COMBINATION DRILLING RIGS

Original No. 1,524,903, dated February 3, 1925, Serial No. 647,569, filed June 25, 1923. Application for reissue filed January 23, 1928. Serial No. 248,932.

This invention relates to mechanism for use in, what is termed in the art, "combination" drilling rigs, which rigs include the equipment for handling cable tools and the equipment for handling rotary drilling tools so that both equipments may be operated through a common tower or derrick.

Combination rigs have gone into wide use in the drilling of oil wells since it has been found that certain formations can best be drilled only with the cable tools and certain formations or drilling operations can best be carried out only through the use of the rotary drilling tools. Moreover, the presence of both types of equipment in the derrick permits greater ease in operating either set of drilling tools and a larger safety factor. Thus, in a combination rig, there is present both the calf wheel of the cable tools and the draw works of the rotary equipment, either of which may be used to raise or lower the casing or drill pipe and upon the breaking down of either the calf wheel or draw works the raising or lowering of the casing or drill pipe may be continued with the other reel. Further, the use of the combination rig gives more variety of speeds of raising or lowering the drill pipe or casing than can be obtained from either of the equipments separately.

In such a combination rig the top of the tower has been provided with a crown block including a plurality of sheaves from which a wire line for raising or lowering the casing is passed and the sheaves are disposed so that a line may be taken from the sheaves in a direction parallel to the reel which is to be employed in raising or lowering the line. It has heretofore been necessary when shifting from the operation of cable tools to the operation of the rotary tools to turn the crown block around on the top of the derrick if the sheaves are to be aligned with the reel when operating the line. This switching around of the crown block necessarily involves a loss of considerable time in the drilling operation which is frequently important. Thus when either the calf wheel or draw works is being employed to raise or lower the casing a break down of the reel operating mechanism may occur at a time in which the movement of the casing must be continued or the casing will freeze in the well. Occasionally in the art a line is run directly to the draw works at an angle to the sheave receiving the line in which case an angled pull is exerted upon the sheave which is very detrimental to the sheave, producing very rapid wear on the bearings, sheave and wire line.

An object of this invention is to provide well drilling mechanism for raising and lowering the casing or drill pipe which mechanism provides a common wire line connection between both the calf wheel and draw works and the crown block, so that the line may be operated from either the calf wheel or draw works while each end of the line is parallel to the sheave of the crown block receiving that end, whereby changes from cable tools to rotary tools may be made without the necessity of adjusting the crown block.

Another object of this invention is to provide a mechanism including a sheave attachment for the customary crown blocks now in use, whereby the present combination rigs may, with a relatively small cost, be equipped with the sheave attachment for connecting a line to both the calf wheel and draw works from the crown block while maintaining the ends of the line parallel to the sheaves receiving the same.

Other objects and advantages of this invention will be apparent from the description hereinafter contained and will present themselves in the practice of the invention.

In the accompanying drawings there is illustrated a preferred embodiment or method of embodiment of the invention in which—

Figures 1, 2:
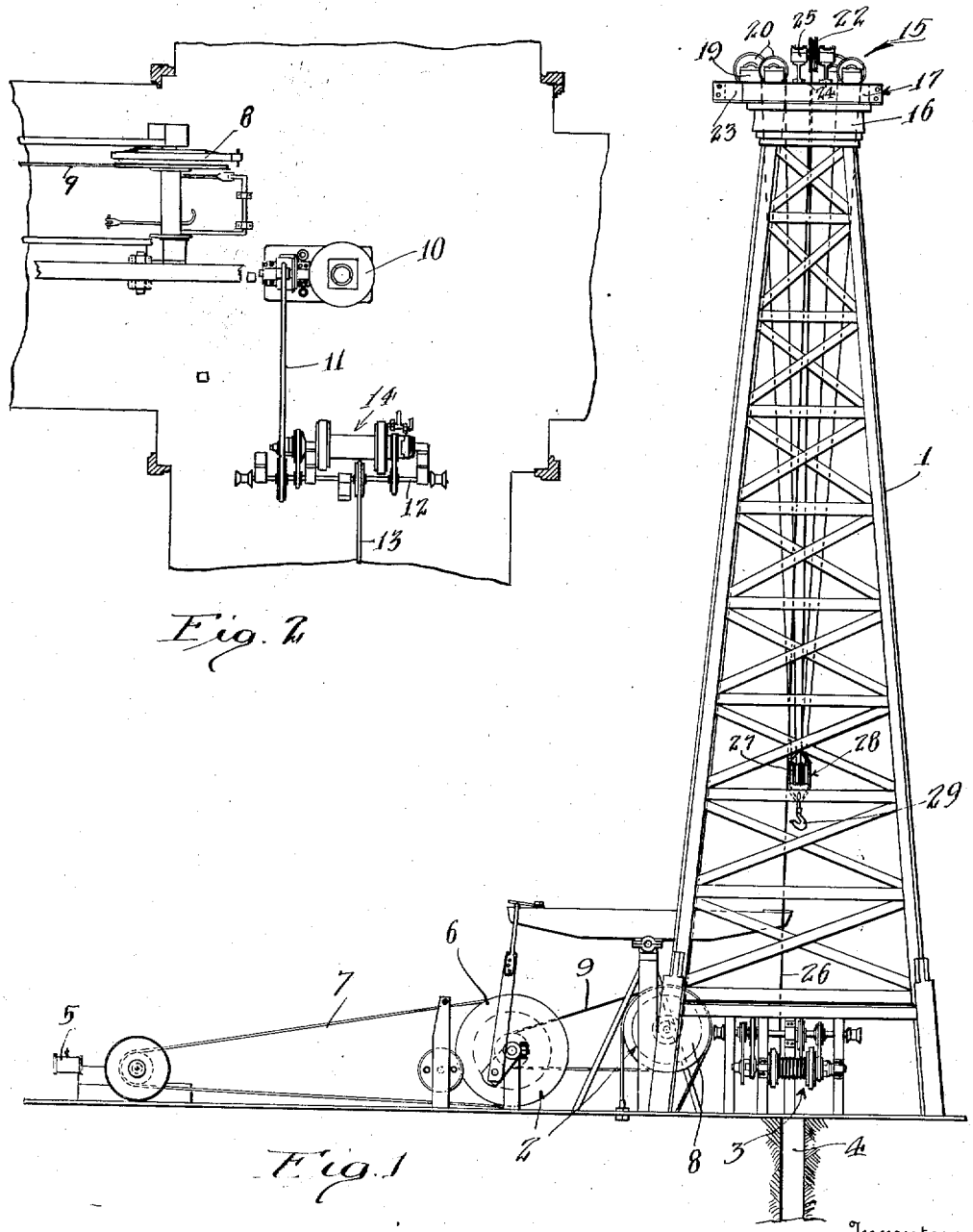
Figure 1 is an elevation of such parts of a combination rig including the invention as is necessary to disclose the operation thereof.
Fig. 2 is a plan view of the floor of the derrick showing the relative position of the calf wheel and draw works.

In the drawings 1 generally indicates a tower to which is connected the cable tool operating mechanism, generally indicated at 2, and the rotary tool mechanism, generally indicated at 3. Such mechanisms generally extend from the well hole, indicated at 4, at right angles to each other. The cable tool equipment may include a suitable prime mover 5 driving a band wheel 6 through a belt 7 from which the calf wheel 8 may be driven through a second belt 9. The details of construction of the calf wheel and operating mechanism are well understood in the art and need not be further described. The rotary tool equipment may include a suitable rotary table 10 driven through a chain or shaft 11 from a second shaft 12 which shaft is driven from a second prime mover (not shown), from the drive 13. The draw works of the rotary tool mechanism is illustrated at 14 which draw works is employed during the rotary method of drilling for raising or lowering casing or drill pipe from a wire line passing from the top of the derrick 1.

15 generally indicates the crown block of this invention which includes the customary water table 16 which mounts a plurality of parallel I-beams 17 which are bolted or otherwise secured to the table, as indicated at 18, and which I-beams 17 support a number of spaced crown block bearings 19 which are disposed to receive shafts transverse to the beams 17. 20 indicates a number of parallel sheaves which are journaled in the crown block bearings 19 and spaced between the parallel beams 17 and mounted to rotate in parallel planes. The sheaves are mounted to rotate on an axis parallel to the axis of the calf wheel 8 or are mounted to rotate on an axis parallel to the draw works 14. Preferably, however, the axis of the sheaves 20 is maintained parallel to the calf wheel 8.

Figure 3:
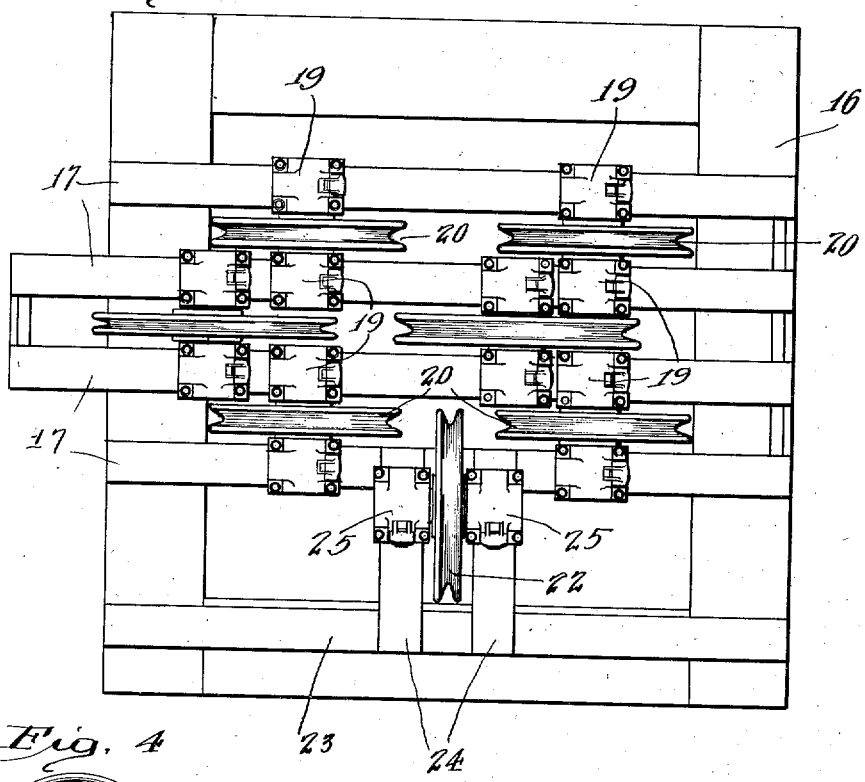
Fig. 3 is a plan view of the crown block employed in this invention.
Figure 4:
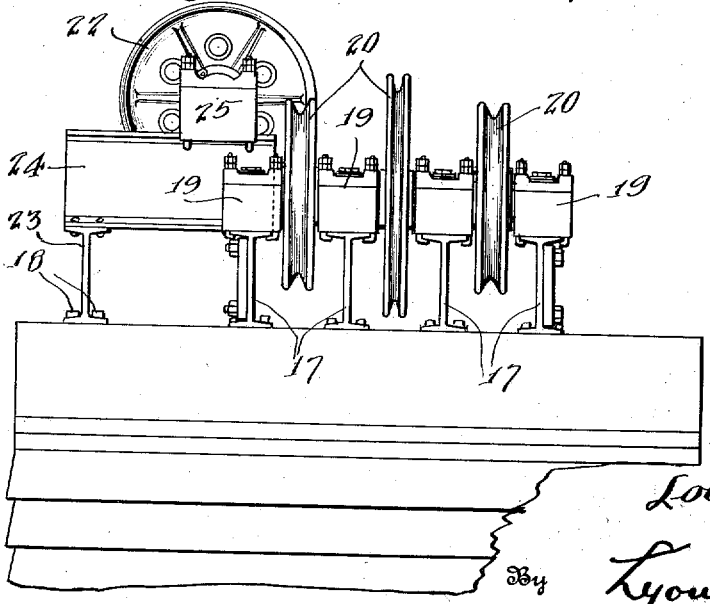
Fig. 4 is an elevation at right angles to Fig. 3.

As shown in the preferred form of the invention, in Figure 3, six of the sheaves 20 are included in the main group, two in each row, with the central row offset or staggered slightly with relation to the outer rows, in order that the lines from the several sheaves will be somewhat spaced apart and prevented from entangling.

22 indicates a sheave disposed to rotate in a plane at an angle to the remaining sheaves 20, being disposed at preferably 90° to such sheaves 20 and positioned to receive a line directly from the draw works 14 in a direction parallel to the plane of the sheave 22. For mounting this angled sheave 22 a beam 23 is provided parallel to the beams 17 and extending across the water table 16. Transverse beams 24 are supported upon the beam 23 and the beam 17 next adjacent the beam 23 and extend transversely to such beams 17. Said beams 24 support crown block bearings 25 in which the sheave 22 is journaled.

Figure 5:
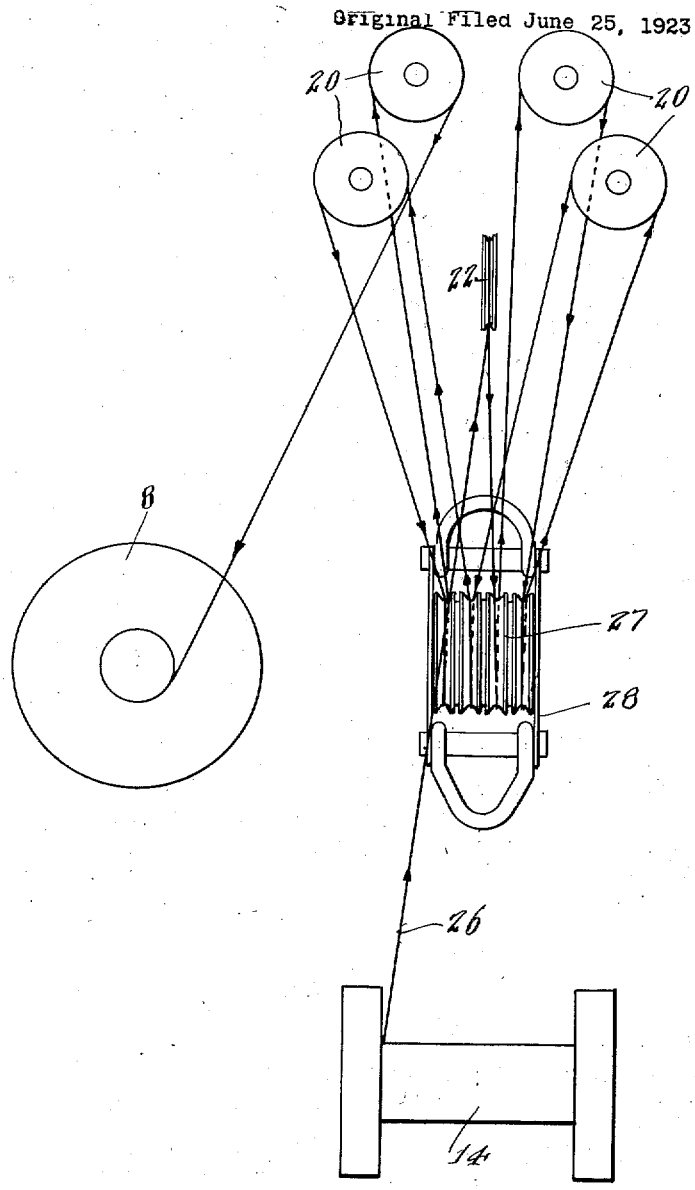
Fig. 5 is a diagrammatic view of a wire line connection proper for using the mechanism.

Referring to Fig. 5 the use and operation of the mechanism is diagrammatically illustrated. From the draw works 14 a wire line 26 passes over the angled sheave 22 from which it extends downwardly through the derrick and is trained around one of the sheaves 27 of a traveling block 28. From the traveling block 28 the line 26 is trained around the sheaves 20 and remaining sheaves 27 of the traveling block finally extending from one of the sheaves 20 to the calf wheel 8 in a direction substantially parallel to the plane of said sheaves 20.

By this construction the casing or tubing may be supported from the traveling block 28 through a hook 29, or other means, and the traveling block 28 is supported from the crown block 15 on the wire line 26, each end of which wire line extends to a reel in a plane substantially parallel to the sheave from which the end extends, and thus either reel, i. e., the calf wheel or draw works, may be employed for raising or lowering the line, the other end of the line being the fixed end and in case it is desired to transfer from one type of drilling tools to the other type of drilling tools, the line 26, crown block 15, and traveling block 28 are already in position for immediately continuing the operation with the second type of equipment. In all cases the pull on the line is directed in the direction in which the least wear upon the line and traveling blocks will take place.

While the mechanism herein described is well suited for the purposes of this invention, it is not the intention to limit the invention to the specific embodiment heretofore described but various modifications may be made within the spirit of the invention. This invention is of the scope set forth in the appended claims.

I claim:

1. In mechanism of the class described, the combination of a tower, two independent line reels mounted to rotate on axes at a substantial angle with each other, a crown block on the tower providing a plurality of rotatable sheaves, one sheave being mounted to rotate on an axis substantially parallel to one of the reels and another sheave being mounted to rotate on an axis parallel to the other reel, a traveling block, and a line extending from one reel over the sheave having an axis parallel to the axis of said reel, supporting said traveling block from the crown block, and extending to the second reel from the sheave mounted to rotate on an axis parallel to said second reel.

2. In a combination rig, the combination of a tower, a traveling block, a calf wheel adjacent the tower, a draw works adjacent the tower and mounted to rotate on an axis at a substantial angle to the axis of the calf wheel, a crown block on the tower having a sheave mounted to rotate on an axis substantially parallel to the axis of the calf wheel and a sheave mounted to rotate on an axis substantially parallel to the draw works, and a line extending from the calf wheel over the first sheave supporting the traveling block and extending from the last sheave to the draw works.

3. In a crown block, the combination of lower sheave means, members supporting said lower sheave means arranged for installation in a derrick top, supporting structure extending upwardly from said members, and upper sheave means supported above said lower sheave means by said structure, the upper sheave means being disposed in a vertical plane substantially perpendicular to the plane of said lower sheave means.

4. In a crown block construction for oil derricks, the combination of a plurality of parallel I-beams, a plurality of sheaves rotatably mounted on the I-beams, a pair of I-beams mounted at right angles to the first said I-beams, and a sheave mounted on the latter said I-beams in a vertical plane substantially perpendicular to the planes of the first said sheaves and above the first said sheaves.

5. In a crown block construction for oil derricks, the combination of a plurality of sheaves, means for rotatably supporting said sheaves, a supporting structure extending above the said sheaves, and upper sheave means journaled in spaced bearings secured to the supporting structure in a horizontal plane above the horizontal plane of the axes of the first said sheaves, the upper sheave means being supported in a vertical plane substantially perpendicular to the planes of the first said sheave means.

6. In a crown block, the combination of: lower sheave means; members supporting said lower sheave means, arranged for installation in a derrick top; removable supporting structure extending upwardly from said members; and upper sheave means supported above said lower sheave means by said structure, the upper sheave means being disposed in a vertical plane substantially perpendicular to the plane of said lower sheave means.

Signed at Syracuse, in the county of Onondaga, and State of New York, this 3d day of January, 1928.

LOUIS H. BACHE.